US008243212B2

(12) United States Patent
Tomizawa et al.

(10) Patent No.: US 8,243,212 B2

(45) Date of Patent: Aug. 14, 2012

(54) DISPLAY APPARATUS, DISPLAY MONITOR AND TELEVISION RECEIVER

(75) Inventors: Kazunari Tomizawa, Kizugawa (JP); Takeshi Kumakura, Nara (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 1233 days.

(21) Appl. No.: 11/793,696

(22) PCT Filed: Feb. 15, 2006

(86) PCT No.: PCT/JP2006/302635

§ 371 (c)(1), (2), (4) Date: Jun. 21, 2007

(87) PCT Pub. No.: WO2006/088049

PCT Pub. Date: Aug. 24, 2006

(65) Prior Publication Data

US 2008/0225183 A1 Sep. 18, 2008

(30) Foreign Application Priority Data

Feb. 21, 2005 (JP) ................................ 2005-044659

(51) Int. Cl.

| | |
|---|---|
| ***H04N 3/14*** | (2006.01) |
| ***H04N 5/70*** | (2006.01) |
| ***G06F 3/038*** | (2006.01) |
| ***G09G 5/10*** | (2006.01) |

(52) U.S. Cl. ........ 348/790; 348/792; 348/800; 345/204; 345/690

(58) Field of Classification Search ........................ None
See application file for complete search history.

(56) References Cited

U.S. PATENT DOCUMENTS

| | | | | |
|---|---|---|---|---|
| 6,094,243 | A | 7/2000 | Yasunishi | |
| 6,097,358 | A * | 8/2000 | Hirakawa et al. | 345/63 |
| 6,229,583 | B1 | 5/2001 | Yasunishi | |
| 2001/0048420 | A1 * | 12/2001 | Yamamoto et al. | 345/89 |
| 2003/0011614 | A1 | 1/2003 | Itoh et al. | |
| 2003/0011626 | A1 * | 1/2003 | Tanabe et al. | 345/690 |
| 2004/0155847 | A1 | 8/2004 | Taoka et al. | |
| 2005/0219270 | A1 * | 10/2005 | De Greef et al. | 345/690 |

(Continued)

FOREIGN PATENT DOCUMENTS

JP 01-260488 10/1989

(Continued)

OTHER PUBLICATIONS

H. Tanaka et al., EMC Technology for 42-inch PDP "PlasmaVision®", Fujitsu General Technical Journal, 1999 No. 1 pp. 9-11, and Partial English Translation thereof.

(Continued)

*Primary Examiner* — Jeffrey Harold
*Assistant Examiner* — Michael Teitelbaum
(74) *Attorney, Agent, or Firm* — Harness, Dickey & Pierce, P.L.C.

(57) ABSTRACT

When dividing one frame into a plurality of sub-frames to carry out image display, in a gradation range which is able to be displayed using only sub-frames other than the last sub-frame (for example, luminance ½ or less in the case of two-part division, and luminance ¾ or less in the case of four-part division), the luminance of the last sub-frame is set as the minimum luminance, and luminance display is carried out using the other sub-frames.

8 Claims, 8 Drawing Sheets

(TWO-PART DIVISION, LUMINANCE 1/4)

(TWO-PART DIVISION, LUMINANCE 3/4)

U.S. PATENT DOCUMENTS

2005/0253785 A1 * 11/2005 Miyasaka et al. ............... 345/63

FOREIGN PATENT DOCUMENTS

| | | |
|---|---|---|
| JP | 1-260488 | 10/1989 |
| JP | 09-251279 | 9/1997 |
| JP | 9-319342 | 12/1997 |
| JP | 10-274954 | 10/1998 |
| JP | 11-231835 | 8/1999 |
| JP | 2000-341651 | 12/2000 |
| JP | 2001-125528 | 5/2001 |
| JP | 2001-296841 | 10/2001 |
| JP | 2001-331157 | 11/2001 |
| JP | 2003-22061 | 1/2003 |
| JP | 2003-29688 | 1/2003 |
| JP | 2003-143476 | 5/2003 |
| JP | 2004-240317 | 8/2004 |

OTHER PUBLICATIONS

PCT/ISA/210.

* cited by examiner (TWO-PART DIVISION, LUMINANCE 1/4)

(TWO-PART DIVISION, LUMINANCE 3/4)

(FOUR-PART DIVISION, LUMINANCE 1/4)

(FOUR-PART DIVISION, LUMINANCE 3/4)

(HOLD, LUMINANCE 1/4)

(HOLD, LUMINANCE 3/4)

(TWO-PART DIVISION, LUMINANCE 1/4)

(TWO-PART DIVISION, LUMINANCE 3/4)

(FOUR-PART DIVISION, LUMINANCE 1/4)

(FOUR-PART DIVISION, LUMINANCE 3/4)

(HOLD, LUMINANCE 1/3)

(HOLD, LUMINANCE 2/3)

(TWO-PART DIVISION, SPLIT RATIO 2 : 1, LUMINANCE 1/3)

(TWO-PART DIVISION, SPLIT RATIO 2 : 1, LUMINANCE 2/3)

(TWO-PART DIVISION, SPLIT RATIO 2 : 1, LUMINANCE 1/3)

(TWO-PART DIVISION, SPLIT RATIO 2 : 1, LUMINANCE 2/3)

DISPLAY APPARATUS, DISPLAY MONITOR AND TELEVISION RECEIVER

TECHNICAL FIELD

The present invention relates to a display apparatus which divides one frame into a plurality of sub-frames to carry out image display.

BACKGROUND ART

In recent years, in addition to CRT (Cathode Ray Tube) display apparatuses, various display apparatuses, such as liquid crystal display apparatuses, plasma display apparatuses and organic EL display apparatuses, have been developed and commercialized.

Display apparatuses, such as the plasma display apparatuses, which carry out impulse display (display carried out only during a light emitting period) normally use time-division driving to carry out gradation display. Moreover, some of display apparatuses, such as the liquid crystal display apparatus and the organic EL display apparatus, which carry out hold display (display of keeping holding an image of a previous frame until a new image is written) use the time-division driving to, for example, prevent unfocused moving images. Note that the time-division driving is a driving method for dividing one vertical period (one frame) a plurality of sub-frames, and writing a signal to each pixel more than once.

For example, the time-division driving in the liquid crystal display apparatus is disclosed in Patent Documents 1 and 2.

Moreover, image signals of various formats which are different in pixel size and/or frequency depending on image sources (television waves, personal computers, videos, games, etc.) which supply image signals are input to recent display apparatuses. However, in a display panel, formats such as a resolution (pixel size) and a refresh frequency (frequency) are fixed. Therefore, when the image signal which is different in format from the display apparatus is input to the display apparatus, image processing is carried out to convert the format of the input image signal into the format of the display apparatus.

That is, as shown in FIG. 7, when a digital image signal whose format is different from the format that can be displayed in a display panel 100 is input to the display apparatus, the display apparatus causes an image processing circuit 101 to carry out format conversion so that the digital image signal can be displayed in the display panel 100. Moreover, when the input image signal is an analog signal, the display apparatus causes an A/D converter 102 to convert the analog signal into a digital signal, and then carries out the format conversion. Moreover, in addition to the format conversion, the image processing circuit 101 may carry out image processing, such as edge enhancement and tone correction.

Moreover, when carrying out the image processing, the display apparatus which carries out the time-division driving divides the input image signal of one frame into image signals corresponding to a plurality of sub-frames. For example, when one frame is 800H (A blanking period is included. Moreover, H denotes one horizontal period.), and is divided into two sub-frame with a split ratio of 1:1, the period of each sub-frame is 400H. Moreover, luminance of each sub-frame is determined so that average luminance of the sub-frames is equal to the luminance of the input image signal.

Patent Document 1: Japanese Unexamined Patent Publication No. 296841/2001 (Tokukai 2001-296841, published on Oct. 26, 2001)

Patent Document 2: Japanese Unexamined Patent Publication No. 22061/2003 (Tokukai 2003-22061, published on Jan. 24, 2003)

Non-Patent Document 1: Hironari TANAKA, Yuki SATO, Hiroaki KATODA, "42 PDP, EMC technique of 'Plasmavision (trademark)'", FUJITSU GENERAL TECHNICAL JOURNAL 1999 No. 1

DISCLOSURE OF INVENTION

However, in conventional display apparatuses, as a result of the format conversion of the input image signal, the width of a synchronization signal is not constant, that is, the period of one frame is not constant and an error occurs in vertical synchronization in many cases. In the time-division driving including the format conversion, there is a problem in that when the time length of one frame changes, the gradation display is affected. The following will explain this problem.

First, referring to FIG. 8, the following will explain a reason why the error occurs in the vertical synchronization. The following will exemplify a case where an input image signal whose vertical synchronization period (frame period) is 562.5H, horizontal synchronization period is 2,200 dots and dot clock frequency is 74.25 MHz is format-converted into an image signal whose vertical synchronization period is 800H, horizontal synchronization period is 1,650 dots and dot clock frequency is 79.2 MHz.

First, as shown in FIG. 8, in the image signal obtained by the format conversion of the input image signal of a vertical synchronization signal (hereinafter referred to as "input VS signal") and a horizontal synchronization signal (hereinafter referred to as "input HS signal"), counting of a horizontal signal pulse (HS pulse) is started from falling of a vertical synchronization signal (hereinafter referred to as "output VS signal"), and thus a horizontal synchronization signal (hereinafter referred to as "output HS signal") is generated. One horizontal synchronization period of the output HS signal is determined by counting 1,650 dots of the clock whose clock frequency is 79.2 MHz.

Even if the start point of the vertical synchronization period of the input VS signal is set to be identical with that of the output VS signal, those end points may not be identical with each other in a case where, for example, the resolution before and after the format conversion is not an integer multiple. Therefore, in the output HS signal, the HS counting is reset when the pulse falling of the input VS signal has occurred, and the horizontal synchronization period at this point is set to the first horizontal synchronization period of a frame. Thus, a synchronization difference occurs between the input VS signal and the output VS signal.

The synchronization difference accumulates as the number of frames increases. When the length of the accumulated synchronization difference exceeds the length of one horizontal period in the output HS signal, a frame whose vertical synchronization period is 801H is generated in the output VS signal (an error of 1H occurs in this frame). That is, when the synchronization difference occurs between the input VS signal and the output VS signal, a frame whose vertical synchronization period includes an error is generated in the image signal whose format has been converted.

Note that the cause of the occurrence of the error of the time length of the frame is not limited to the above-explained example. For example, when the input image signal is an analog signal, the input VS signal itself of the input image signal is unstable, and this may become a factor of the occurrence of the error. Moreover, in the above example, by the error of the synchronization difference, a frame whose period (801H) is longer than a predetermined vertical synchronization period is generated in the output VS signal. However, there is also a possibility that a frame whose period (for example, 799H) is shorter than a predetermined vertical synchronization period may be generated. Further, there is a possibility that the generated error may be 1H or more.

When the frame whose vertical synchronization period includes the error is generated in the image signal whose format has been converted, this error affects the gradation display at the time of the time-division driving. The following will explain this in reference to FIG. 9.

First, when the period of one frame is 800H, and the split ratio for the sub-frames is 1:1, the period of each of a first-half sub-frame and a second-half sub-frame is set to 400H. The image processing section which divides frames counts 400H from the pulse generation of the vertical synchronization (VS) signal to determine the period of the first-half sub-frame, and sets the remaining period, which is until the pulse generation of the next VS signal, as the second-half sub-frame.

In this case, in the frame including no error, the period of each of the first-half sub-frame and the second-half sub-frame can be set to 400H. However, in the frame including the error (for example, one frame is 801H), the period of the first-half sub-frame is set to 400H, but the error is intensively included in the second-half sub-frame. Thus, the split ratio for the sub-frames becomes different from a desired split ratio.

In the case of carrying out the time-division driving, the split ratio for the sub-frames needs to be a desired value. Therefore, when the frame includes the error, the gradation display is adversely affected.

The present invention was made to solve the above problems, and an object of the present invention is to realize a display apparatus which carries out the time-division driving and can reduce the adverse affect on the gradation display when the frame includes the error.

To solve the above problems, a display apparatus of the present invention displays an image by time-dividing one frame into a plurality of sub-frames, and the display apparatus includes a display section which displays a luminance image based on gradation data of a display signal as input; and a control section which generates in each sub-frame a display signal to be output to the display section in such a manner that a total luminance output from the display section in one frame remains unchanged by the time-division of the frame, wherein in a gradation range capable of performing display by using the sub-frames other than a last sub-frame in one frame period, the control section generates a display signal in each sub-frame so that the luminance of the last sub-frame is made a minimum luminance.

Moreover, another display apparatus of the present invention displays an image by time-dividing one frame into a plurality of sub-frames, and the display apparatus includes: a display section which displays a luminance image based on gradation data of a display signal as input; a format conversion section which converts a format of an image signal, input from outside the display apparatus, into a format which is able to be displayed in the display section; and a control section which, based on the image signal whose format is converted by the format conversion section, generates in each sub-frame a display signal to be output to the display section in such a manner that a total luminance output from the display section in one frame remains unchanged by the time-division of the frame, wherein in a gradation range capable of performing display by using the sub-frames other than a last sub-frame in one frame period, the control section generates a display signal in each sub-frame so that the luminance of the last sub-frame is made a minimum luminance.

In the image signal input to the display apparatus, the length of the vertical synchronization period of each frame may vary (when there exists a frame including an error), or the error may occur when carrying out the format conversion of the image signal. When the error occurs in the display apparatus which divides one frame into a plurality of sub-frames to carry out the image display, the luminance displayed in the period including the error adversely affects the display gradation.

In contrast, according to the above arrangement, in the gradation range which is able to be displayed using the sub-frames other than the last sub-frame, the display signal of each sub-frame is generated so that the luminance of the last sub-frame is the minimum luminance. That is, in the display apparatus, even when there exists the frame including the error, the error exists only in the last sub-frame. Therefore, by carrying out display while minimizing the use of the last sub-frame, it is possible to reduce the adverse affect on the gradation display.

Moreover, in the above display apparatus, a split ratio for the sub-frames is inequable, and the last sub-frame is set the sub-frame of the shortest period.

Moreover, in the above display apparatus, one frame is divided into two sub-frames that are a first-half sub-frame and a second-half sub-frame, and the period of the first-half sub-frame is longer than that of the second-half sub-frame.

That is, if the split ratio for the sub-frames is not the equal division (1:1, etc.), the display signal of each sub-frame is generated so that the sub-frame whose period is the shortest is the last sub-frame, and the luminance of the last sub-frame is the minimum luminance. In this case, the effects of the present invention can be obtained significantly.

Moreover, in the display apparatus, the display section is set so that a liquid crystal panel displays an image.

Moreover, by combining the display apparatus and a signal input section which transmits an externally input image signal to the control section, it is possible to configure a liquid crystal monitor used in, for example, a personal computer.

Here, the image signal input section transmits the externally input image signal to the control section. In this configuration, the control section of the present display apparatus generates the display signal and outputs it to the display section on the basis of the image signal transmitted from the image signal input section.

Moreover, in the above display monitor, the signal input section may have a function of converting the format of the input image signal into a format which is able to be displayed in the display section.

Moreover, by combining the display apparatus and a tuner section, it is possible to configure a liquid crystal television receiver.

Here, the tuner section selects a channel of a television broadcasting signal, and transmits a television image signal of the selected channel to the control section. In this configuration, the control section of the present display apparatus generates the display signal and outputs it to the display section on the basis of the television image signal transmitted from the tuner section As above, the display apparatus of the present invention displays an image by time-dividing one frame into a plurality of sub-frames, and the display apparatus includes: a display section which displays a luminance image based on gradation data of a display signal as input; and a control section which generates in each sub-frame a display signal to be output to the display section in such a manner that a total luminance output from the display section in one frame remains unchanged by the time-division of the frame, wherein in a gradation range capable of performing display by using the sub-frames other than a last sub-frame in one frame period, the control section generates a display signal in each sub-frame so that the luminance of the last sub-frame is made a minimum luminance.

Therefore, even when the length of the vertical synchronization period of each frame varies (even when there exists a frame including an error) in the image signal input to the display apparatus, in the gradation range which is able to be displayed using the sub-frames other than the last sub-frame, the display signal of each sub-frame is generated so that the luminance of the last sub-frame is the minimum luminance. Therefore, even when there exists the frame including the error, the error exists only in the last sub-frame. Therefore, by carrying out display while minimizing the use of the last sub-frame, it is possible to reduce the adverse affect on the gradation display.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1(*b*) shows an embodiment of the present invention, and is a diagram showing an example in which the sub-frames of higher luminance are embedded from the front of the frame of the display apparatus which carries out the time-division driving.

FIG. 1(*c*) shows an embodiment of the present invention, and is a diagram showing an example in which the sub-frames of higher luminance are embedded from the front of the frame of the display apparatus which carries out the time-division driving.

FIG. 1(*d*) shows an embodiment of the present invention, and is a diagram showing an example in which the sub-frames of higher luminance are embedded from the front of the frame of the display apparatus which carries out the time-division driving.

FIG. 3(*b*) shows a comparative example of the present invention, and is a diagram showing an example in which the sub-frames of higher luminance are embedded from the back of the frame of the display apparatus which carries out the time-division driving.

FIG. 3(*c*) shows a comparative example of the present invention, and is a diagram showing an example in which the sub-frames of higher luminance are embedded from the back of the frame of the display apparatus which carries out the time-division driving.

FIG. 3(*d*) shows a comparative example of the present invention, and is a diagram showing an example in which the sub-frames of higher luminance are embedded from the back of the frame of the display apparatus which carries out the time-division driving.

FIG. 3(*e*) shows a comparative example of the present invention, and is a diagram showing an example in which the sub-frames of higher luminance are embedded from the back of the frame of the display apparatus which carries out the time-division driving.

FIG. 3(*f*) shows a comparative example of the present invention, and is a diagram showing an example in which the sub-frames of higher luminance are embedded from the back of the frame of the display apparatus which carries out the time-division driving.

FIG. 4(*b*) is a diagram explaining an example in which the split ratio is 2:1 for the sub-frames of the frame of the display apparatus which carries out the time-division driving.

FIG. 4(*c*) is a diagram explaining an example in which the split ratio is 2:1 for the sub-frames of the frame of the display apparatus which carries out the time-division driving.

FIG. 4(*d*) is a diagram explaining an example in which the split ratio is 2:1 for the sub-frames of the frame of the display apparatus which carries out the time-division driving.

FIG. 4(*e*) is a diagram explaining an example in which the split ratio is 2:1 for the sub-frames of the frame of the display apparatus which carries out the time-division driving.

FIG. 4(*f*) is a diagram explaining an example in which the split ratio is 2:1 for the sub-frames of the frame of the display apparatus which carries out the time-division driving.

BEST MODE FOR CARRYING OUT THE INVENTION

[Embodiment 1]

Figure 1:
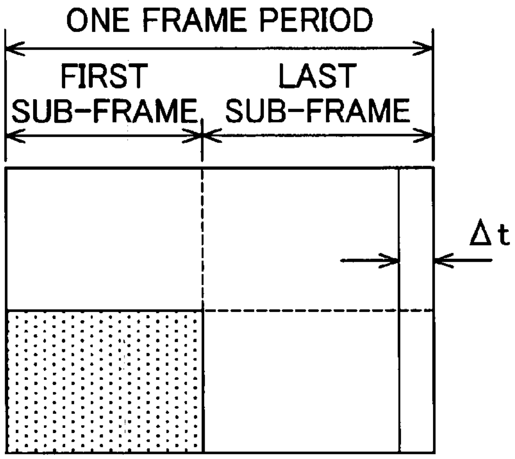
FIG. 1(*a*) shows an embodiment of the present invention, and is a diagram showing an example in which sub-frames of higher luminance are embedded from the front of a frame of a display apparatus which carries out time-division driving.
Figure 1:
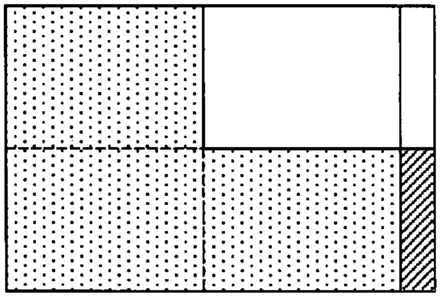
Figure 1:
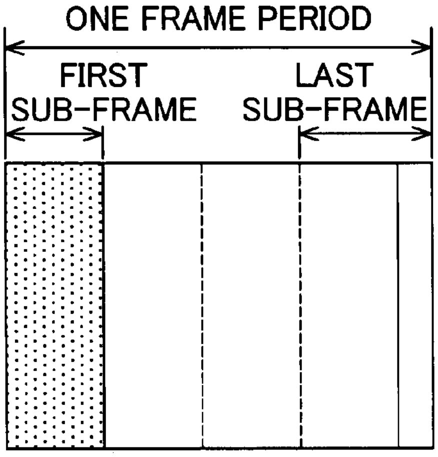
Figure 1:
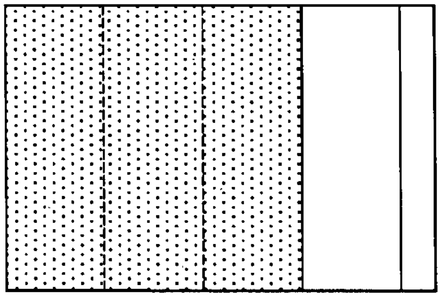

The following will explain one embodiment of the present invention on the basis of FIGS. 1(*a*) to 1(*d*), 2, 3(*a*) to 4(*f*), 5 and 6. Note that a display apparatus of the present embodiment includes a vertical alignment (VA) mode liquid crystal panel which is divided into a plurality of domains. The present display apparatus functions as a liquid crystal monitor which causes the liquid crystal panel to display an externally input image signal.

Figure 2:
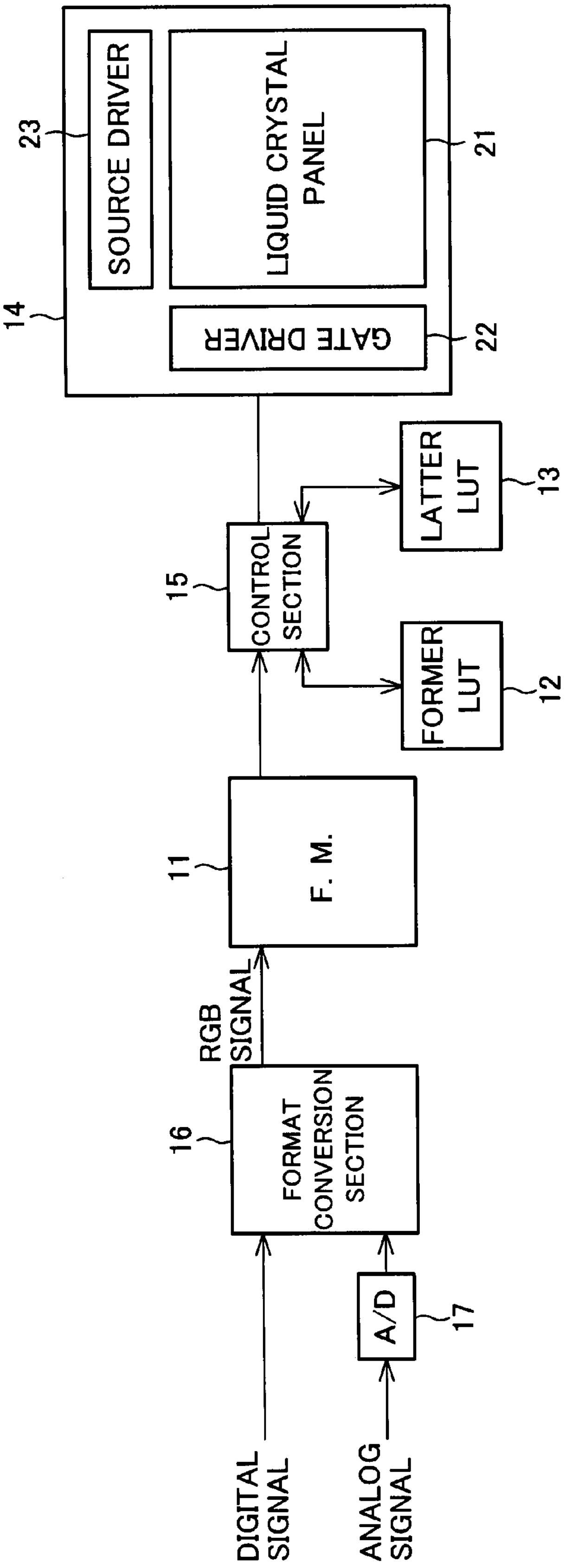
FIG. 2 is a block diagram showing an internal arrangement of a display apparatus of an embodiment of the present invention.

FIG. 2 is a block diagram showing an internal arrangement of the present display apparatus. As shown in FIG. 2, the present display apparatus includes a frame memory (F.M.) 11, a former LUT 12, a latter LUT 13, a display section 14, a control section 15, a format conversion section 16, and an A/D converter 17.

The frame memory 11 accumulates, for one frame, an image signal (RGB signal) input from an external signal source via the format conversion section 16. Each of the former LUT (look-up table) 12 and the latter LUT 13 is a correspondence table (conversion table) of (i) the externally input image signal and (ii) a display signal output to the display section 14.

Note that the present display apparatus carries out the time-division driving, that is, sub-frame display. The sub-frame display is a method for carrying out display by dividing one frame into a plurality of sub-frames.

The present display apparatus is designed to carry out, on the basis of the image signal of one frame which signal is input in one frame period, display at a frequency that is twice that of the image signal by two sub-frames whose sizes (periods) are equal to each other. That is, the split ratio for the sub-frames is 1:1.

The former LUT 12 is the correspondence table for the display signal (former display signal, second display signal) output in the first-half sub-frame. The latter LUT 13 is the correspondence table for the display signal (latter display signal, first display signal) output in the second-half sub-frame. Data in the former LUT 12 and the latter LUT 13 are based on results calculated in advance, however the display apparatus of the present invention does not have to include the former LUT 12 or the latter LUT 13. The control section 15 may calculate the display signal output in each sub-frame. The display apparatus of the present invention may be arranged so as to include the former LUT 12 and the latter LUT 13, wherein the control section 15 reads out from these LUTs, a display signal as output in each sub-frame. With this arrangement, the burden of the control section 15 can be reduced.

As shown in FIG. 2, the display section 14 includes a liquid crystal panel 21, a gate driver 22 and a source driver 23, and caries out the image display on the basis of the input display signal. The liquid crystal panel 21 is an AV mode active matrix (TFT) liquid crystal panel.

The control section 15 is a brain of the present display apparatus and controls all the operations of the present display apparatus. Using the former LUT 12 and the latter LUT 13, the control section 15 generates the display signal from the image signal accumulated in the frame memory 11, and outputs it to the display section 14.

That is, the control section 15 stores, in the frame memory 11, the display signal transmitted at a normal output frequency (normal clock, 25 MHz for example). Then, the control section 15 outputs, from the frame memory 11, the display signal twice by a clock whose frequency (double clock, 50 MHz) is twice the frequency of the normal clock.

Then, the control section 15 generates the former display signal using the former LUT 12 on the basis of the image signal output firstly. Then, the control section 15 generates the latter display signal using the latter LUT 13 on the basis of the image signal output secondly. Then, the control section 15 sequentially outputs these display signals to the display section 14 by the double clock.

Thus, the display section 14 displays different images once in one frame period on the basis of two display signals input sequentially (In each sub-frame period, all gate lines of the liquid crystal panel 21 are turned ON once). An output operation of the display signal will be explained later in detail.

Moreover, when the format of the externally input image signal is different from the format which can be displayed in the display section 14, the format conversion section 16 and the A/D converter 17 carry out the format conversion so that the format of the image signal becomes the format which can be displayed in the display section 14. When the externally input image signal is a digital signal, the image signal is input directly to the format conversion section 16, and the format conversion is carried out. However, when the externally input image signal is an analog signal, the image signal is converted by the A/D converter 17 into a digital signal, and then it is input to the format conversion section 16.

The following will explain the generation of the former display signal and the latter display signal by the control section 15. First, the following will explain common display luminance (luminance of an image displayed by a panel) regarding the liquid crystal panel.

When an image of normal 8-bit data is displayed by one frame without using the sub-frames (when all the gate lines of the liquid crystal panel are turned ON once in one frame period, when a normal hold display is carried out), gradation data (signal gradation) of the display signal has levels of 0 to 255.

The signal gradation and the display luminance in the liquid crystal panel are approximately shown by Formula (1) below.

$$((T-T0)/(T\max-T0))=(L/L\max)\hat{}\gamma \qquad (1)$$

In Formula (1), L denotes the signal gradation (frame gradation) when an image is displayed by one frame (when an image is displayed by the normal hold display), Lmax denotes a maximum luminance gradation (255), T denotes the display luminance, $T_{max}$ denotes maximum luminance (luminance when L=Lmax=255; white), T0 denotes minimum luminance (luminance when L=0; black), and γ denotes a correction value (usually 2.2).

Note that in the actual liquid crystal panel 21, T0 is not 0. However, for ease of explanation, T0 is 0 in the following description.

Next, the following will explain the display luminance in the present display apparatus. In the present display apparatus, the control section 15 is designed to carry out gradation expression so that the following (a) and (b) are satisfied.

(a) The total (integral luminance in one frame) of the luminance (display luminance) of the image displayed in the first-half sub-frame by the display section 14 and the luminance (display luminance) of the image displayed in the second-half sub-frame by the display section 14 is equal to the display luminance of one frame when carrying out the normal hold display.

(b) One of the sub-frames is black (minimum luminance) or white (maximum luminance).

On this account, in the present display apparatus, the control section 15 is designed to divide the frame into two sub-frames and display, in one sub-frame, the luminance that is up to half the maximum luminance.

That is, when the luminance that is up to half the maximum luminance (threshold luminance; Tmax/2) is output in one frame (in the case of the low luminance), the control section 15 sets one of the first-half sub-frame and the second-half sub-frame up as the minimum luminance (black) and changes only the display luminance of another sub-frame, so as to carry out the gradation expression (the control section 15 uses only one of the sub-frames to carry out the gradation expression). In this case, the integral luminance in one frame is the luminance that is "(the minimum luminance+(the luminance of the sub-frame)/2".

Moreover, when outputting the luminance that is higher than the threshold luminance (in the case of the high luminance), the control section 15 sets one of first-half sub-frame and the second-half sub-frame up as the maximum luminance (white) and changes the display luminance of another sub-frame, so as to carry out the gradation expression. In this case, the integral luminance in one frame is the luminance that is "(the luminance of the sub-frame+the maximum luminance)/2".

Next, the following will explain in detail a signal gradation setting of the display signal (the former display signal and the latter display signal) to obtain the above display luminance. Note that the signal gradation setting is carried out by the control section 15 shown in FIG. 2.

The control section 15 uses the above Formula (I) to calculate in advance the frame gradation corresponding to the above threshold luminance (Tmax/2).

That is, the frame gradation (the threshold luminance gradation; Lt) corresponding to the above display luminance is obtained as follows using Formula (1).

$$Lt=0.5\hat{}(1/\gamma)\times L\text{max} \quad (2)$$

$$L\text{max}=T\text{max}\hat{}\gamma \quad (2a)$$

Then, when displaying the image, the control section 15 determines the frame gradation L on the basis of the image signal output from the frame memory 11. If L is Lt or less, the control section 15 sets the former display signal and the latter display signal using the former LUT 12 and the latter LUT 13' so that the gradation data (F) of the display signal of one of the sub-frames is set to minimum (0) and the gradation data (R) of the display signal of another sub-frame is data obtained by Formula (3) below on the basis of Formula (I).

$$R=0.5(1/\gamma)\times L \quad (3)$$

Moreover, if the frame gradation L is more than Lt, the control section 15 sets the gradation data R of the display signal of one of the sub-frames to maximum (255) up as maximum (255) and sets the gradation data F of the display signal of another sub-frame up as data obtained by Formula (4) below on the basis of Formula (I).

$$F=(L\gamma-0.5\times L\text{max}\gamma)(1/\gamma) \quad (4)$$

Next, the following will explain in more detail the output operation of the display signal in the present display apparatus. In the following description, the number of pixels in the liquid crystal panel 21 is a×b. In this case, the control section 15 accumulates, in the source driver 23, the former display signals of pixels (a pixels) of a first gate line by the double clock.

Then, the control section 15 causes the gate driver 22 to turn ON the first gate line and write the former display signal, read out from the former LUT 12, to the pixels of the first gate line. Then, the control section 15 turns ON the second to b-th gate lines by the double clock in the same manner as above while changing the former display signals accumulated in the source driver 23. Thus, the former display signal can be written to all the pixels within half the period of one frame (½ frame period).

Further, the control section 15 carries out the same operation as above to write the latter display signal to the pixels of all the gate lines within the remaining ½ frame period. Thus, each of the former display signal and the latter display signal is written to each pixel for the same period of time (½ frame period).

Note that in the time-division driving explained above, the method for determining the display luminance of each sub-frame is just one example, and the method for determining the display luminance of the sub-frame is not especially limited in the present invention. That is, the time-division driving of the present invention is defined as a displaying method in which there are a plurality of sub-frames, and the total (integral luminance in one frame) of luminance (display luminance) of images displayed respectively in the sub-frames on a display section is equal to the display luminance of one frame when carrying out the normal hold display.

In the display apparatus which carries out the above-described time-division driving, there is no problem as long as the error does not occur in the frame, and the vertical synchronization period of each frame is constant. However, if the error is included in the frame, the split ratio for the sub-frames does not become a desired value, and the gradation display is adversely affected, which are the problems of the conventional technology as descried above.

Then, the present display apparatus has a function of carrying out the format conversion of the externally input image signal by the format conversion section 16 so that the externally input image signal can be displayed in the display section 14, and when carrying out the format conversion, the error may be included in the frame.

If the display gradation is affected by the error included in the frame, the degree of the affect changes depending on how the luminance of each sub-frame is embedded. That is, the affect on the display gradation changes depending on whether the sub-frame of low luminance is placed at the first half of the frame or at the second half of the frame. On this account, the display apparatus of the present invention is characterized in that by defining how to embed the luminance of the sub-frame, the affect on the display gradation is reduced when the error is included in the frame. The following will explain this characteristic in detail.

Figure 3:
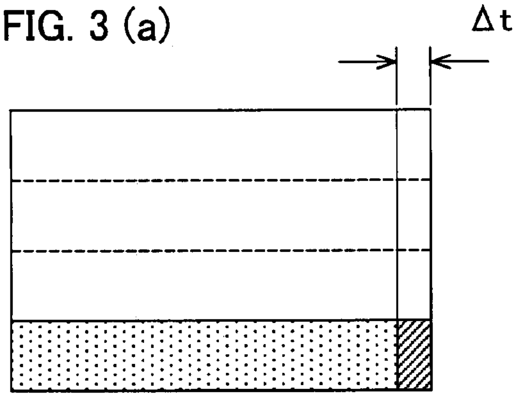
FIG. 3(*a*) shows a comparative example of the present invention, and is a diagram showing an example in which the sub-frames of higher luminance are embedded from the back of the frame of the display apparatus which carries out the time-division driving.
Figure 3:
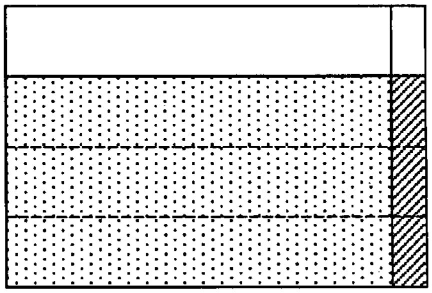
Figure 3:
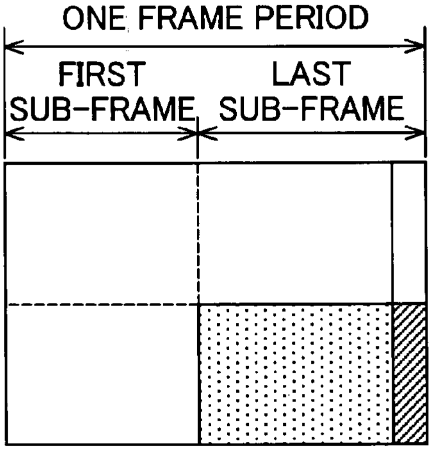
Figure 3:
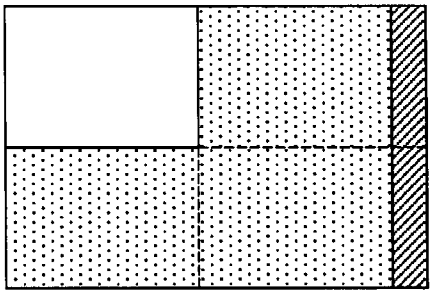
Figure 3:
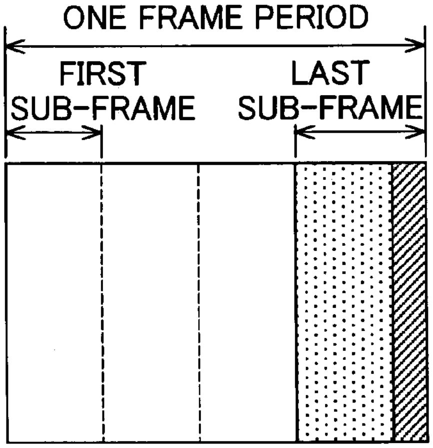
Figure 3:
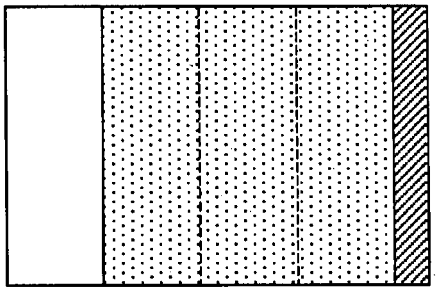

FIGS. 3(*a*) to 3(*f*) are diagrams prepared for the purpose of comparison with the present invention, and show an example in which the sub-frames of higher luminance are embedded from the back of the frame.

FIGS. 3(*a*) and 3(*b*) respectively show a case of carrying out the display of the luminance ¼ (¼ of the maximum luminance) in the normal hold display and a case of carrying out the display of the luminance ¾ in the normal hold display. In these cases, the display of the luminance ¼ or the luminance ¾ is carried out in the entire one frame period. However, if a time error Δt is included in the frame, the integral luminance of ¼×Δt or ¾×Δt occurs as the error.

FIGS. 3(*c*) and 3(*d*) respectively show the display of the luminance ¼ (¼ of the maximum luminance) and the display of the luminance ¾ (¾ of the maximum luminance) when one frame is divided into two sub-frames (the split ratio is 1:1, and the refresh frequency here is twice the refresh frequency at the time of the hold display). In FIG. 3(*c*) in which the display of the luminance ¼ is carried out, the display of the minimum luminance is carried out in the first-half sub-frame, and the display of the ½ luminance is carried out in the second-half sub-frame. If the time error Δt is included in the frame, it is included only in the second-half sub-frame, so that the integral luminance of ½×Δt occurs as the error.

Moreover, in FIG. 3(*d*) in which the display of the luminance ¾ is carried out, the display of the ½ luminance is carried out in the first-half sub-frame, and the display of the maximum luminance is carried out in the second-half sub-frame. If the time error Δt is included in the frame, it is included only in the second-half sub-frame, so that the integral luminance of 1×Δt occurs as the error.

FIGS. 3(*e*) and 3(*f*) respectively show the display of the luminance ¼ and the display of the luminance ¾ when one frame is divided into four sub-frames (the split ratio is 1:1:1:1, and the refresh frequency here is four times the refresh frequency at the time of the hold display). In FIG. 3(*e*) in which the display of the luminance ¼ is carried out, the display of the minimum luminance is carried out in each of the first three sub-frames, and the display of the maximum luminance is carried out in the last sub-frame. Note that the last sub-frame is the last sub-frame in one frame period which is divided into a plurality of sub-frames. If the time error Δt is included in the frame, it is included only in the last sub-frame, so that the integral luminance of 1×Δt occurs as the error.

Moreover, in FIG. 3(*f*) in which the display of the luminance ¾ is carried out, the display of the minimum luminance is carried out in the first sub-frame, and the display of the maximum luminance is carried out in each of the last three sub-frames. If the time error Δt is included in the frame, the integral luminance of 1×Δt occurs as the error.

That is, according to the comparison among FIGS. 3(*a*) to 3(*f*), when the time-division driving is carried out, and the sub-frames of higher luminance are embedded from the back of the frame, the error (the integral luminance) which affects the display gradation is larger than that of the normal hold display. Further, the error of the four-part division is larger than the error of the two-part division. That is, the error becomes larger as the number of division increases.

In contrast, FIGS. 1(*a*) to 1(*d*) show an example of the present embodiment, and is an example in which the sub-frames of higher luminance are embedded from the front of the frame. To embed the sub-frames of higher luminance from the front of the frame, the data stored in the former LUT 12 and the latter LUT 13 may be set so in the present display apparatus shown in FIG. 2, and the display apparatus does not require any special means.

FIGS. 1(*a*) and 1(*b*) respectively show the display of the luminance ¼ and the display of the luminance ¾ when one frame is divided into two sub-frames (the split ratio is 1:1, and the refresh frequency here is twice the refresh frequency at the time of the hold display). In FIG. 1(*a*) in which the display of the luminance ¼ is carried out, the display of the ½ luminance is carried out in the first-half sub-frame, and the display of the minimum luminance is carried out in the second-half sub-frame. If the time error Δt is included in the frame, it is included only in the second-half sub-frame, so that the integral luminance does not occur as the error.

Moreover, in FIG. 1(*b*) in which the display of the luminance ¾ is carried out, the display of the maximum luminance is carried out in the first-half sub-frame, and the display of the ½ luminance is carried out in the second-half sub-frame. If the time error Δt is included in the frame, it is included only in the second-half sub-frame, so that the integral luminance of ½×Δt occurs as the error. However, this error is smaller than the error occurred when carrying out the display of the luminance ¾ in the hold display (FIG. 3(*b*)).

FIGS. 1(*c*) and 1(*d*) respectively show the display of the luminance ¼ and the display of the luminance ¾ when one frame is divided into four sub-frames (the split ratio is 1:1:1:1, and the refresh frequency here is four times the refresh frequency at the time of the hold display). In FIG. 1(*c*) in which the display of the luminance ¼ is carried out, the display of the maximum luminance is carried out in the first sub-frame, and the display of the minimum luminance is carried out in each of the last three sub-frames. Even if the time error Δt is included in the frame, the integral luminance does not occur as the error.

Moreover, in FIG. 1(*d*) in which the display of the luminance ¾ is carried out, the display of the maximum luminance is carried out in each of the first three sub-frames, and the display of the minimum luminance is carried out in the last sub-frame. Even if the time error Δt is included in the frame, the integral luminance does not occur as the error.

That is, according to the comparison among FIGS. 1(*a*) to 1(*d*), when the time-division driving is carried out, and the sub-frames of higher luminance are embedded from the front of the frame, the error (the integral luminance) which affects the display gradation is smaller than that of the normal hold display. Therefore, it is possible to reduce the affect, on the display gradation, caused by the error included in the frame. Further, the error of the four-part division is smaller than the error of the two-part division. That is, the error becomes smaller as the number of division increases.

In the above explanation, the case where the affect on the display gradation can be reduced is the case where the sub-frames of higher luminance are embedded from the front of the frame. However, since the error is included only in the last sub-frame practically, the luminance can be freely embedded in the sub-frames as long as the luminance in the last sub-frame is embedded last. For example, when one frame is divided into four parts and time-division display is carried out, the display of up to the luminance ¾ is carried out only by the first three sub-frames (in this case, the luminance of the last sub-frame is the minimum luminance), and the last sub-frame may be used when carrying out the display of more than the luminance ¾. In the case of the display of up to the luminance ¾, the luminance of each of the first three sub-frames can be set optionally.

Moreover, in the present embodiment, the sub-frame display of the present display apparatus is explained so that the frame is divided into two or four sub-frames. However, the number of division of the frame is not limited to these. The present display apparatus may be designed to carry out the sub-frame display in which the frame is divided into three or more sub-frames.

Figure 4:
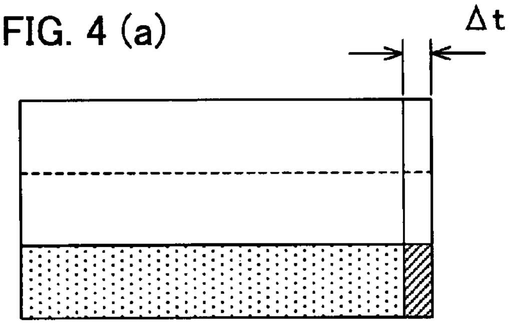
FIG. 4(*a*) is a diagram explaining an example in which the split ratio is 2:1 for the sub-frames of the frame of the display apparatus which carries out the time-division driving.
Figure 4:
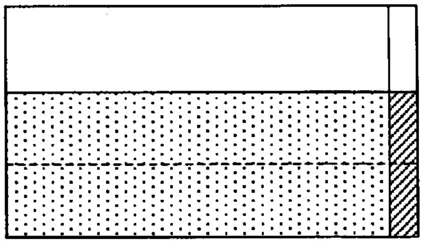
Figure 4:
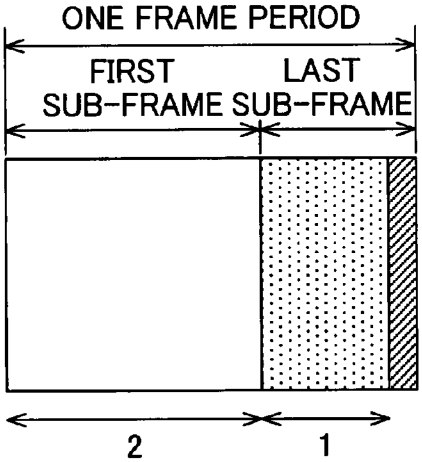
Figure 4:
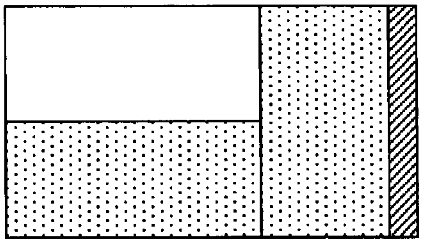
Figure 4:
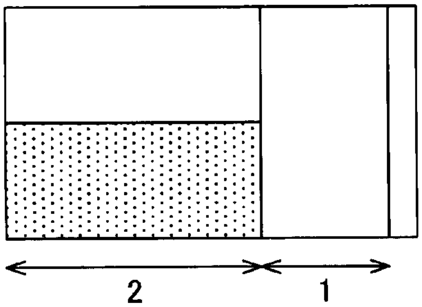
Figure 4:
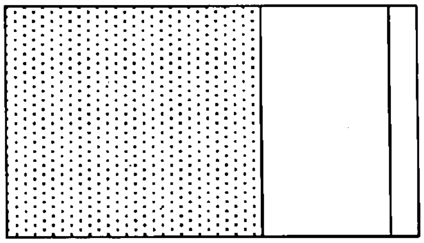

Moreover, the split ratio of the sub-frame does not have to be an equal division such as 1:1, and the frame division may be carried out in accordance with any split ratio (for example, 2:1 or 3:2). FIGS. 4(*a*) to 4(*f*) show a case where the present invention is applied to a display apparatus in which the number of division for the sub-frames is two, and the split ratio is 2:1.

FIGS. 4(*a*) and 4(*b*) respectively show a case of carrying out the display of the luminance ⅓ (⅓ of the maximum luminance) in the normal hold display and a case of carrying out the display of the luminance ⅔ in the normal hold display. In these cases, the display of the luminance ¼ or the luminance ¾ is carried out in the entire one frame period. However, if the time error Δt is included in the frame, the integral luminance of ¼×Δt or ¾×Δt occurs as the error.

FIGS. 4(*c*) and 4(*d*) respectively show the display of the luminance ⅓ (⅓ of the maximum luminance) and the display of the luminance ⅔ (⅔ of the maximum luminance) when one frame is divided into two sub-frames and the split ratio is 2:1, and the luminance are embedded from a second-half field. In FIG. 4(*c*) in which the display of the luminance ⅓ is carried out, the display of the minimum luminance is carried out in the first-half sub-frame, and the display of the maximum luminance is carried out in the second-half sub-frame. If the time error Δt is included in the frame, it is included only in the second-half sub-frame, so that the integral luminance of 1×Δt occurs as the error.

Moreover, in FIG. 4(*d*) in which the display of the luminance ⅔ is carried out, the display of the ½ luminance is carried out in the first-half sub-frame, and the display of the maximum luminance is carried out in the second-half sub-frame. If the time error Δt is included in the frame, it is included only in the second-half sub-frame, so that the integral luminance of 1×Δt occurs as the error.

Although not shown here, in a case where (i) the split ratio for the sub-frames is 1:1 (equal division), and (ii) the luminance are embedded from the second-half field, the integral luminance of ⅔×Δt occurs as the error when the display of the luminance ⅓ is carried out, and the integral luminance $1\times\Delta t$ occurs as the error when the display of the luminance ⅔ is carried out. Therefore, in the case where the luminance are embedded from the second-half field, the integral luminance increases as the error (the error increases in the display of the luminance ⅓) when the split ratio of the frame is inequable.

Meanwhile, FIGS. 4(*e*) and 4(*f*) respectively show the display of the luminance ⅓ (⅓ of the maximum luminance) and the display of the luminance ⅔ (⅔ of the maximum luminance) when one frame is divided into two sub-frames and the split ratio is 2:1, and the luminance are embedded from a first-half field. In FIG. 4(*e*) in which the display of the luminance ⅓ is carried out, the display of the ½ luminance is carried out in the first-half sub-frame, and the display of the minimum luminance is carried out in the second-half sub-frame. In this case, even if the time error $\Delta t$ is included in the second-half frame, the integral luminance does not occur as the error.

Moreover, in FIG. 4(*f*) in which the display of the luminance ⅔ is carried out, the display of the maximum luminance is carried out in the first-half sub-frame, and the display of the minimum luminance is carried out in the second-half sub-frame. Again, even if the time error $\Delta t$ is included in the second-half frame, the integral luminance does not occur as the error.

Here, in a case where (i) the split ratio for the sub-frames is 1:1 (equal division), and (ii) the luminance are embedded from the first-half field, the integral luminance does not occur as the error when the display of the luminance ⅓ is carried out, and the integral luminance of $⅓\times\Delta t$ occurs as the error when the display of the luminance ⅔ is carried out. Therefore, in the case where the luminance are embedded from the first-half field, the integral luminance decreases as the error (the error decreases in the display of the luminance ⅔) when the split ratio of the frame is inequable.

That is, when the split ratio for the sub-frames is not the equal division (1:1, or the like), the sub-frame whose period is shorter is set as the second-half sub-frame, and the sub-frames of higher luminance are embedded from the front of the frame. In this way, the effects of the present invention can be obtained significantly. That is, when one frame is divided into two sub-frames that are the first-half sub-frame and the second-half sub-frame, the period of the first-half sub-frame is set to be longer than the period of the second-half sub-frame. When the number of division for the sub-frames is three or more, and the split ratio is not the equal division (the split ratio is inequable), the sub-frame whose period is the shortest may be set as the last sub-frame.

Moreover, the liquid crystal panel 21 of the present display apparatus may be an NB (Normally Black) type or an NW (Normally White) type. Further, instead of the liquid crystal panel 21, the present display apparatus may use any display panel (for example, the organic EL panel or the plasma display panel) as long as the display panel carries out the time-division driving.

Figure 5:
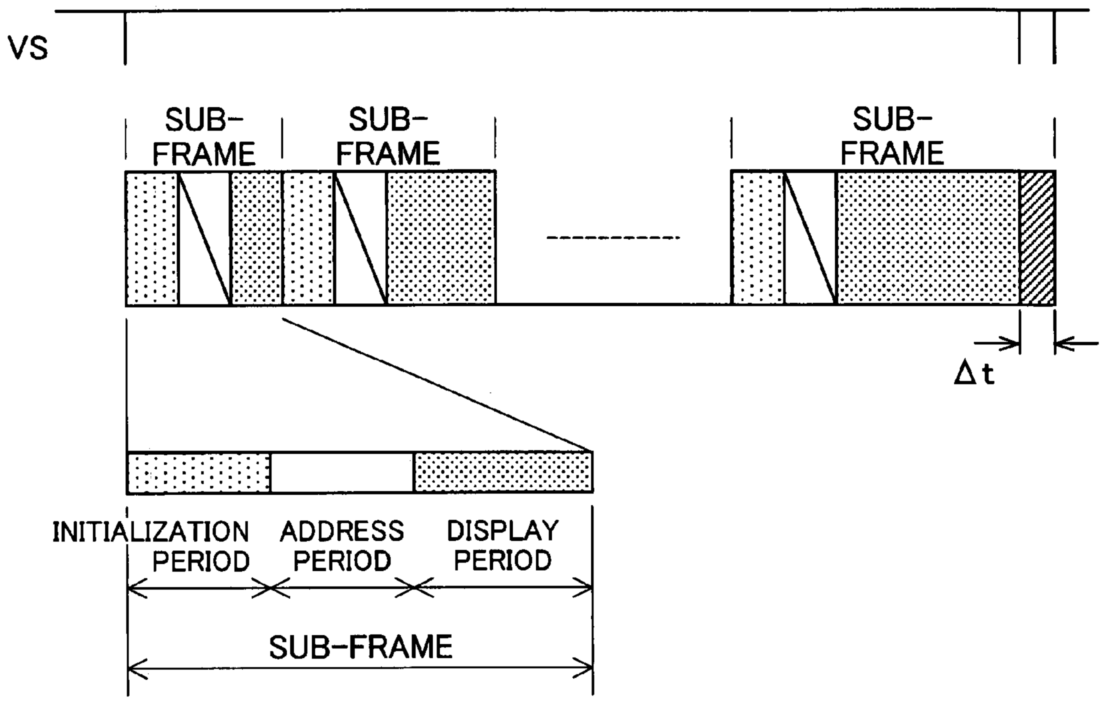
FIG. 5 is a diagram showing one example of a driving method of a plasma display panel.

For example, as shown in FIG. 5, a method for driving the plasma display panel is to drive the panel by generally dividing each sub-frame into an initialization period, an address period and a display period (see Non-Patent Document 1). Here, when the error $\Delta t$ occurs in the frame, the error is included in the display period of the last sub-frame. Therefore, when the luminance display is carried out in the last sub-frame, the gradation display is affected, which is the same as the case of the liquid crystal panel. Therefore, also in the plasma display panel, it is preferable to carry out the luminance display while minimizing the use of the last sub-frame (the execution of the minimum display is maximized).

Figure 6:
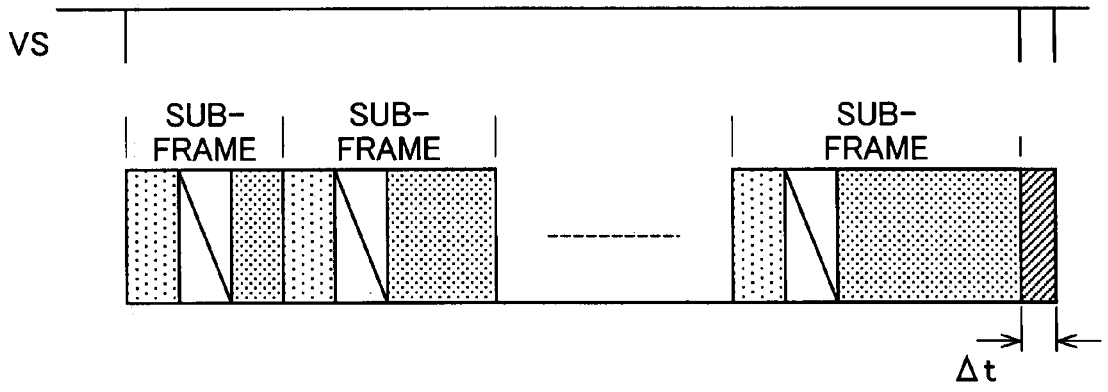
FIG. 6 is a diagram showing another example of the driving method of the plasma display panel.
Figure 7:
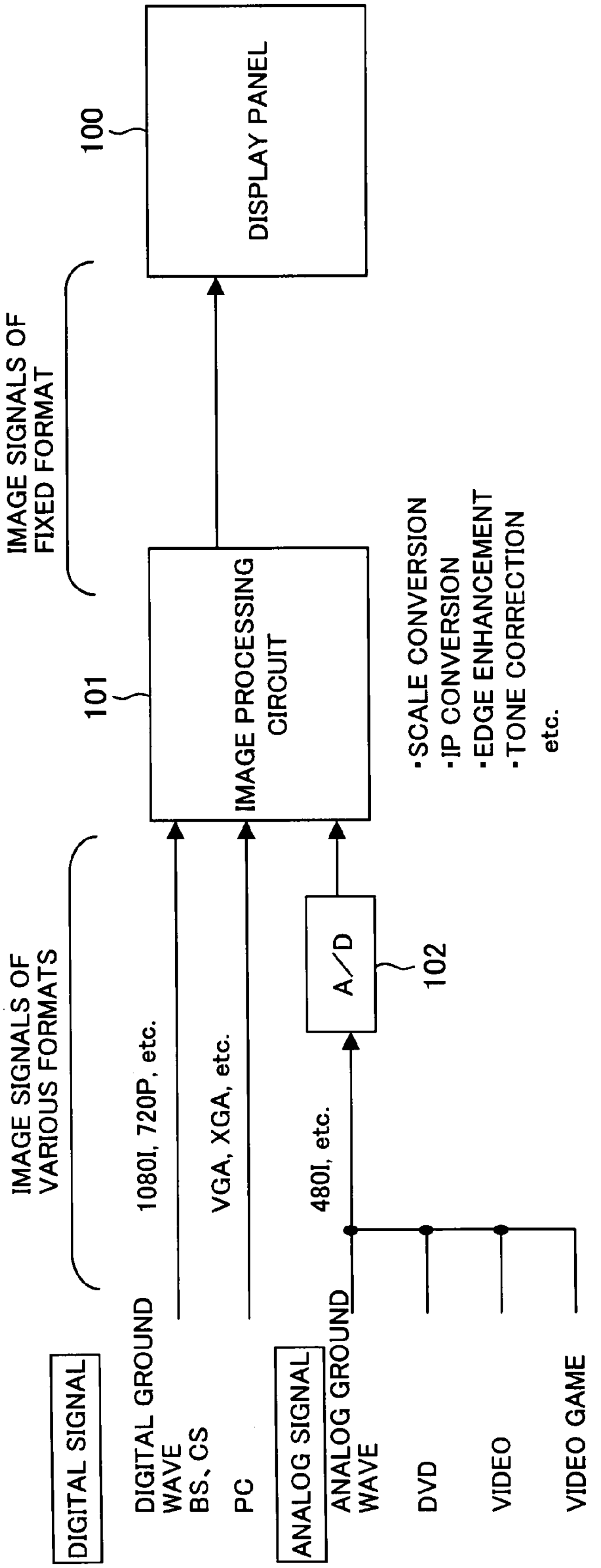
FIG. 7 is a block diagram showing an example of an arrangement of means for carrying out the format conversion of the input image signal in the display apparatus.
Figure 8:
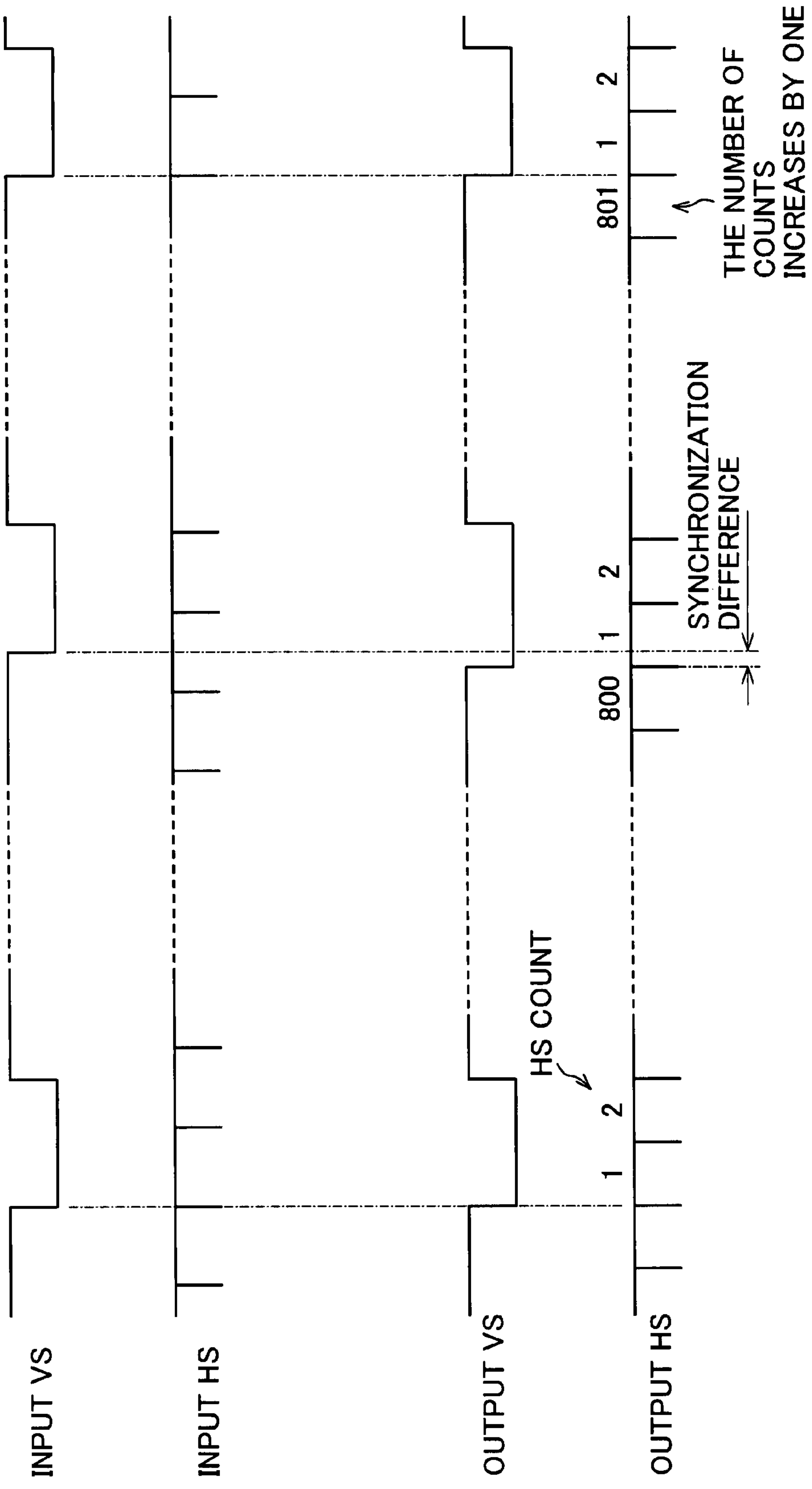
FIG. 8 is a timing chart explaining a principle of the occurrence of the synchronization difference of the vertical synchronization signal at the time of the format conversion.
Figure 9:
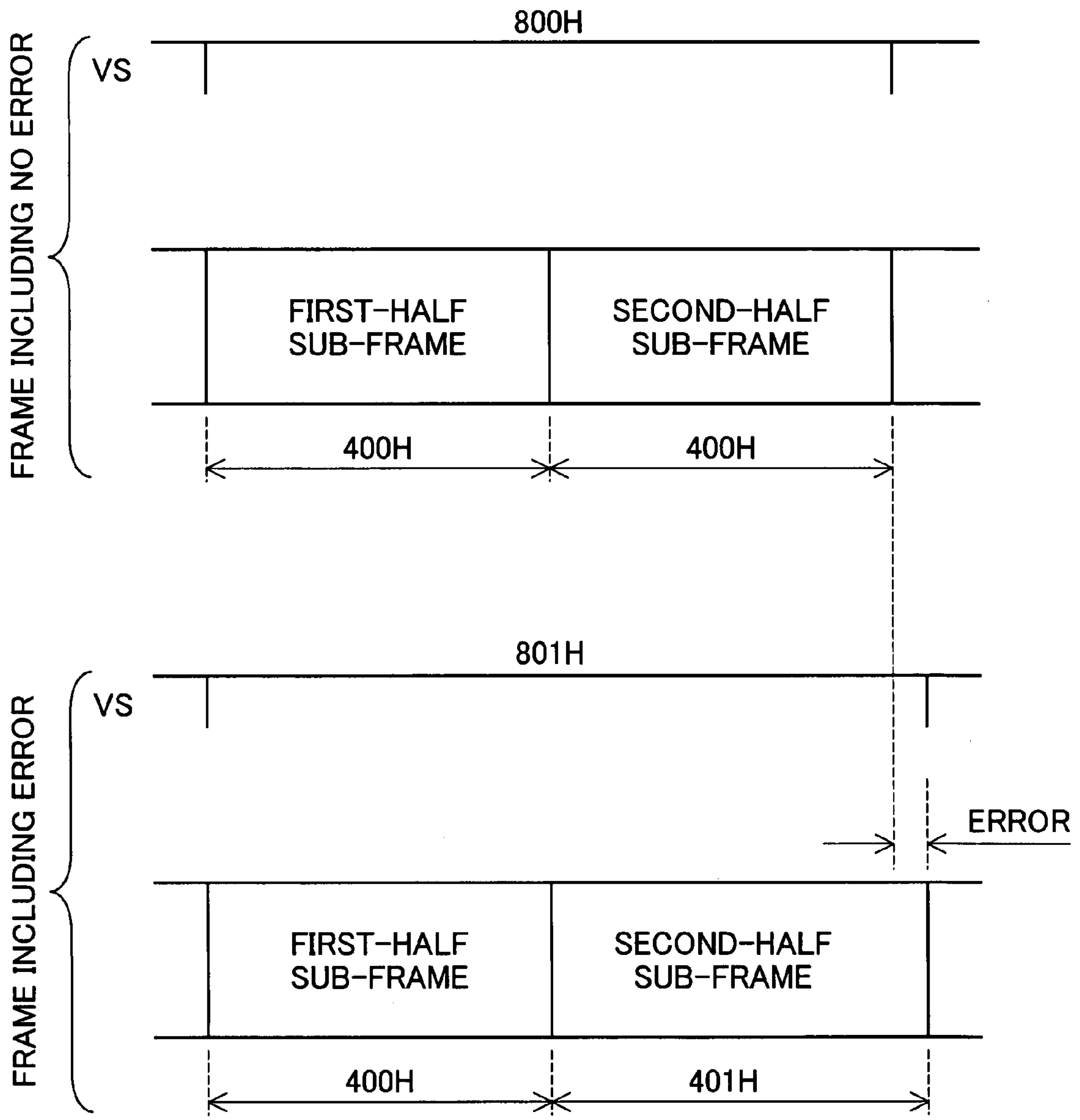
FIG. 9 is a diagram showing a frame including an error when the frame including the error is generated in the vertical synchronization period of the image signal whose format has been converted.

Moreover, as shown in FIG. 6, in the plasma display panel, the last sub-frame period is determined on the basis of the current VS pulse, not on the basis of the next VS pulse, as with the other sub-fields. Thus, it is possible to eliminate the affect of the error on the gradation display. That is, in this case, since the remaining error is added to the blanking period (black display period) or the initialization period of the first sub-frame in the next frame, the change of the display period due to the error does not occur, and the affect on the display gradation can be eliminated.

However, in the liquid crystal display panel, it is difficult to realize the driving method in which the black display period corresponding to the error is inserted. In addition, the liquid crystal display panel does not have the initialization period of the plasma display panel. Therefore, reducing the affect on the display gradation due to the error by the driving method of the present invention is effective especially in the liquid crystal display panel.

Moreover, in the above explanation, all the operations in the present display apparatus are carried out by the control of the control section 15. However, the present invention is not limited to this. A program for carrying out the operations may be recorded in a recording medium, and an information processing apparatus which can read out the program may be used instead of the control section 15.

In this arrangement, a processing unit (CPU or MPU) of the information processing apparatus reads out the program recorded in the recording medium to carry out the operation. Therefore, the program itself is regarded as realizing the operation.

Here, as the information processing apparatus, it is possible to use common computers (workstations and personal computers) and also possible to use function extension boards and function extension units which are attached to computers.

Moreover, the above program is a program code (executable format program, intermediate code program, source program, etc.) of software which realizes an operation. The program may be used alone or in combination with the other program (OS, etc.). Moreover, the program may be read out from the recording medium, be temporarily stored in a memory (RAM, etc.) of a device, be read out again from the memory, and be executed.

Moreover, the recording medium in which the program is recorded may be easily separated from the information processing apparatus, or be fixed in (attached to) the apparatus. Further, the recording medium may be connected to the apparatus as an external memory device.

Examples of the recording medium are magnetic tapes such as video tapes and cassette tapes, magnetic disks such as floppy (trademark) discs and hard discs, optical disks (optical magnetic discs) such as CD, MO, MD and DVD, memory cards such as IC cards and optical cards, semiconductor memories such as mask ROM, EPROM, EEPROM and flash ROM, etc.

Moreover, the recording medium connected to the information processing apparatus via a network (intranet, Internet, etc) may be used. In this case, the information processing apparatus downloads the program via the network to obtain it. That is, the program may be obtained via a transmission media (a media holding a program in a floating manner), such as the network (connected to fixed line or wireless line). It is preferable that a program for the downloading be stored in advance in the apparatus (or in a transmission device or reception device).

Moreover, in the present embodiment, the present display apparatus functions as a display monitor, such as a liquid crystal monitor. However, the present display apparatus can also function as a television receiver. Such a television receiver can be realized by providing a tuner section in the present display apparatus. The tuner section selects a channel of a television broadcasting signal, and transmits a television image signal of the selected channel to the control section 15 via the frame memory 11. In this arrangement, the control section 15 generates the display signal on the basis of the television image signal.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to a display apparatus which carries out the time-division driving, and can reduce an affect, on the display gradation, caused by the error included in the frame.

The invention claimed is:

1. A display apparatus which displays an image by time-dividing one frame into a plurality of sub-frames, said display apparatus comprising:

a display section which displays a luminance image based on gradation data of a display signal as input; and a control section which generates in each sub-frame a display signal to be output to said display section in such a manner that a total luminance output from said display section in one frame remains unchanged by the time-division of the frame, wherein in every gradation range capable of performing display by using the sub-frames other than a last sub-frame in one frame period, said control section generates a display signal in each of the sub-frames other than the last sub-frame so that the last sub-frame is not used.

2. A display apparatus which displays an image by time-dividing one frame into a plurality of sub-frames, said display apparatus comprising:

a display section which displays a luminance image based on gradation data of a display signal as input;

a format conversion section which converts a format of an image signal, input from outside the display apparatus, into a format which is able to be displayed in the display section; and a control section which, based on the image signal whose format is converted by the format conversion section, generates in each sub-frame a display signal to be output to said display section in such a manner that a total luminance output from said display section in one frame remains unchanged by the time-division of the frame, wherein in every gradation range capable of performing display by using the sub-frames other than a last sub-frame in one frame period, said control section generates a display signal in each of the sub-frames other than the last sub-frame so that the last sub-frame is not used.

3. The display apparatus as set forth in claim 1, wherein a split ratio for the sub-frames is inequable, and the last sub-frame is set the sub-frame of the shortest period.

4. The display apparatus as set forth in claim 1, wherein one frame is divided into two sub-frames that are a first-half sub-frame and a second-half sub-frame, and a period of the first-half sub-frame is longer than that of the second-half sub-frame.

5. The display apparatus as set forth in claim 1, wherein the display section is set so that a liquid crystal panel displays an image.

6. A display monitor, comprising:

the display apparatus as set forth in claim 1; and a signal input section which transmits an externally input image signal to the control section, the control section of the display apparatus being designed to generate the display signal on the basis of the image signal.

7. The display monitor as set forth in claim 6, wherein the signal input section has a function of converting a format of the input image signal into a format which is able to be displayed in the display section.

8. A television receiver, comprising:

the display apparatus as set forth in claim 1; and a tuner section which selects a channel of a television broadcasting signal, and transmits a television image signal of the selected channel to the control section, the control section of the display apparatus being designed to generate the display signal on the basis of the television image signal.

* * * * *